United States Patent Office 3,307,003
Patented Feb. 28, 1967

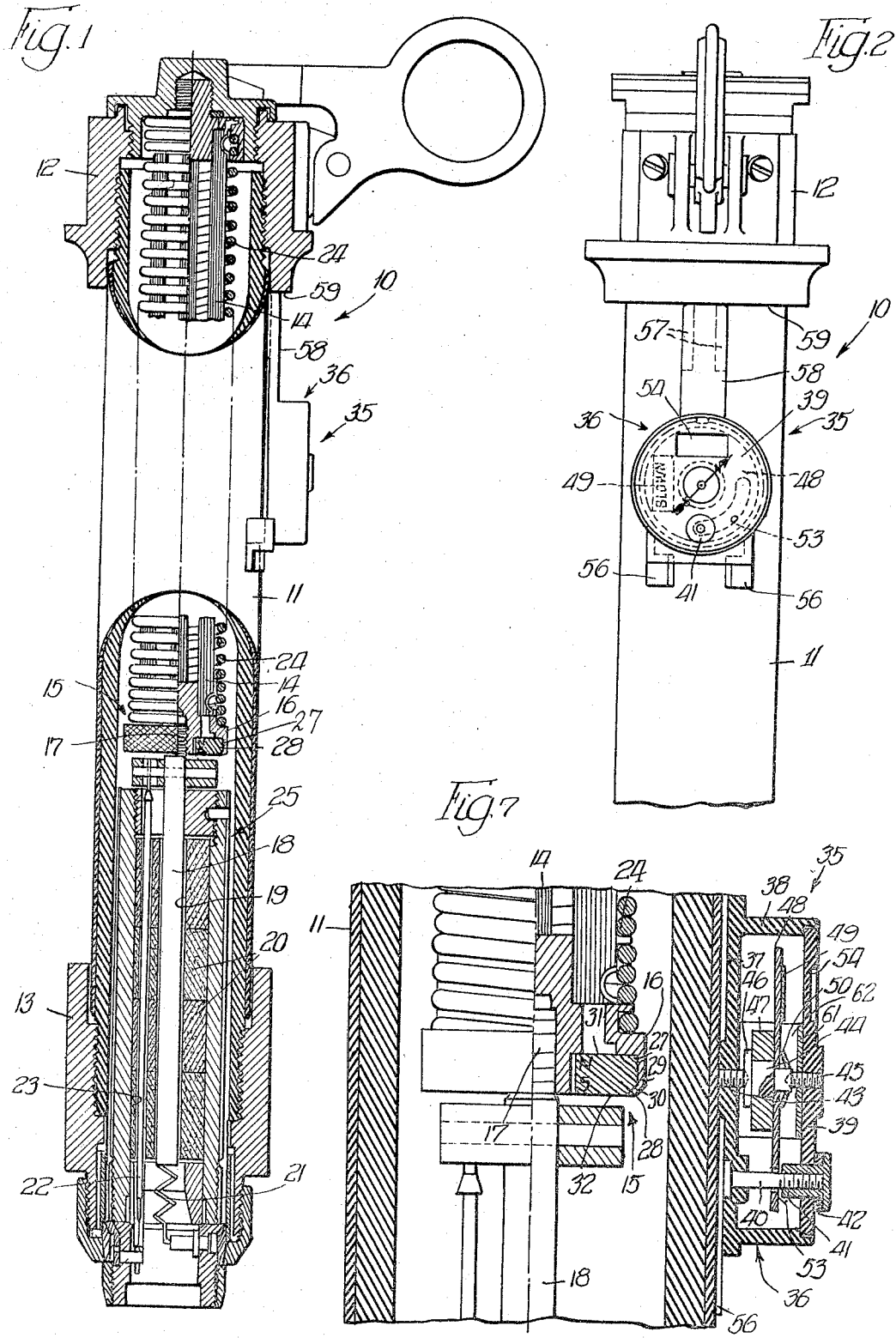

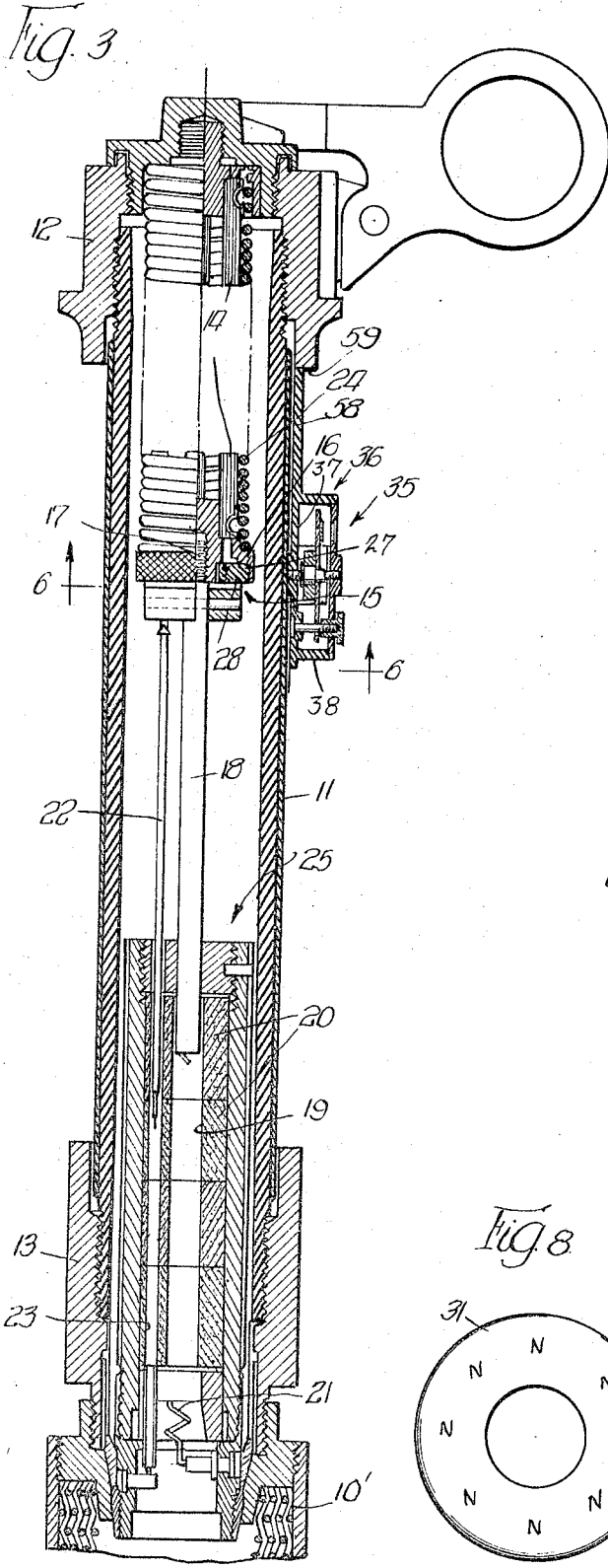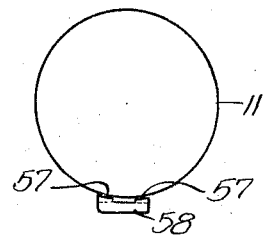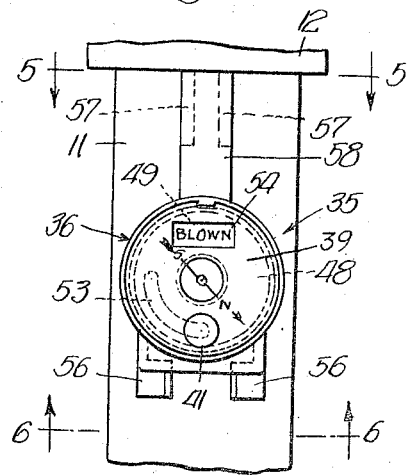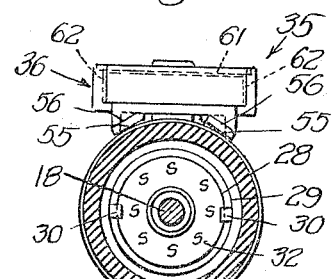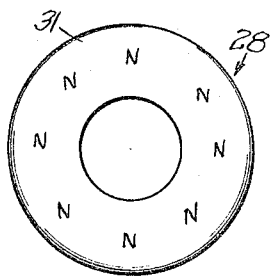

3,307,003
INDICATOR MEANS
Sigurd I. Lindell, Northbrook, Ill., assignor to S & C Electric Company, Chicago, Ill., a corporation of Delaware
Filed Nov. 23, 1965, Ser. No. 509,368
12 Claims. (Cl. 200—121)

This invention relates, generally, to circuit interrupting devices and it has particular relation to devices for indicating the condition thereof, such as indicating that a fuse has blown.

Among the objects of this invention are: to provide for indicating the changed position of a current carrying member of an electric circuit interrupter without requiring mechanical connection thereto or to a part or parts movable therewith; to accomplish the indication magnetically by positioning a permanent magnet on the movable member, such as the current carrying member, for shifting the position of a magnetically responsive indicator from one indicating position to another indicating position when the movable member has reached an alternate position; to arrange for the permanent magnet to embrace the path of current flow and to magnetize the permanent magnet in such manner that the demagnetizing effect on it by the magnetic field generated by the current flow is negligible; to employ for this purpose a permanent magnet having an annular configuration and positioned concentrically about the axis of the movable current carrying member with opposite polarities on opposite faces whereby its effect on the magnetically responsive indicator is independent of its axial position; to provide the magnetically responsive indicator in the form of an annular permanent magnet having opposite polarities along a diameter and for mounting it to rotate about an axis perpendicular to the axis and path of the permanent magnet on the movable member; to mount the annular permanent magnet indicator in a non-magnetic or insulating housing and on a non-magnetic or insulating housing for the member movable with the current carrying member; to provide indicia bearing indicator means movable with the annular permanent magnet indicator from one position to another position corresponding to the terminal positions of the member movable with the current carrying members; to employ for the movable member a terminal assembly of a fuse, the terminal assembly being movable from one position in the unblown condition of the fuse to another position in the blown condition of the fuse and carrying with it the annular permanent magnet with the annular permanent magnet indicator being in close juxtaposition to the terminal assembly and the permanent magnet carried thereby when they are in the blown fuse condition; to provide the permanent annular indicator and non-magnetic housing therefor as a unitary assembly for independent application to a fuse tube housing; and to provide for positioning this unitary assembly on the fuse tube housing such that the permanent magnet indicator is in operative juxtaposition to the permanent magnet on the movable terminal assembly in the fuse blown condition.

A fuse or other circuit interrupting device applied to operate selectively with another protective device in series circuit relation may be called on to carry short circuit current that is cleared by such other protective device without blowing the fuse or operating the circuit interrupting device. In such cases it may be important to know that the fuse did not blow or the circuit interrupting device did not operate. A further object of this invention is to so locate the permanent magnets of the indicator such that they will not be demagnetized by flow of short circuit current, whether or not the fuse blows, to permit repeated operation without replacement.

In the drawings: FIG. 1 is a view, in side elevation, of a solid material fuse embodying this invention, certain parts being shown in section in order to illustrate more clearly the details of construction of the fuse. FIG. 2 is a view, in side elevation, of the upper portion of the fuse shown in FIG. 1 with the indicator of the present invention mounted thereon. FIG. 3 is a vertical sectional view of the fuse shown in FIGS. 1 and 2 and illustrating the position of the parts when the fuse has been blown. FIG. 4 is a view, similar to a portion of FIG. 2, showing the indicator in the blown fuse position. FIG. 5 is a view taken generally along the line 5—5 of FIG. 4 for the purpose of only showing how the spacer is secured to the fuse tube housing. FIG. 6 is a horizontal sectional view taken generally along the line 6—6 of FIG. 3 and 6—6 of FIG. 4. FIG. 7 is a vertical sectional view, at an enlarged scale, showing the details of construction of the indicator assembly with the movable fuse terminal assembly in the blown fuse condition. FIG. 8 is a top plan view of the annular permanent magnet mounted on the terminal assembly as shown in FIG. 7. FIG. 9 is a view, in side elevation, of the annular permanent magnet shown in FIG. 8.

Referring now to FIGS. 1, 2 and 3 of the drawings, reference character 10 designates, generally, a solid material fuse of conventional construction. The solid material fuse 10 is shown to illustrate how the present invention can be applied for indicating the condition of the fuse. However, the present invention can be employed for other purposes such as for indicating the changed position of a current carrying member of a circuit interrupter of the separable contact type or, in general, to indicate the changed position of a member behind a non-ferrous wall.

The fuse 10 includes a fuse tube housing 11 of suitable insulating material having upper and lower fuse tube terminals 12 and 13 at its ends. The upper fuse tube terminal 12 is connected by a flexible conductor 14 to a movable terminal assembly, indicated generally at 15. The movable terminal assembly 15 includes a terminal fitting 16 to which one end 17 of a rod-like conductor or terminal 18 is threaded. The rod-like conductor or terminal 18 extends through a main bore 19 in a stack of cakes 20 of solid arc extinguishing material. At its other end the rod-like conductor or terminal 18 is connected by a fusible element 21 to the lower fuse tube terminal 13. In parallel with the rod-like conductor or terminal 18 is a strain element assembly 22 which extends from the lower fuse tube terminal 13 through an auxiliary bore 23 in the cakes 20 of arc extinguishing material. At its upper end the strain element assembly 22 is suitably secured to the upper end of the rod-like conductor or terminal 18. A coil tension spring 24 extends between the upper fuse tube terminal 12 and the terminal fitting 16 for biasing the latter upwardly. The force exerted by the spring 24 is retrained by the strain element assembly 22.

The fuse 10 is intenended for operation on relatively high voltage circuits and to have different normal current carrying capacities, depending upon the particular circuit involved. For example, the fuse 10, with suitable construction, is operable on circuits ranging upwardly from 4.8 kv. with current ratings of the order of ½ ampere to 400 amperes as determined by choice of a replaceable refill unit 25 which includes the rod-like conductor 18, cakes 20 of arc extinguishing material, fusible element 21 and strain element assembly 22. Other voltage and current ratings are applicable with corresponding changes in the construction of the fuse 10. When the circuit in which the fuse 10 is connected is subjected to an overcurrent, which may be of the order of several thousands of amperes, the fusible element 21 is blown and the current flow is transferred to the strain element assembly 22 and it promptly blows and no longer restrains the spring 24. The spring 24 then collapses to the position shown in FIG. 3 and moves the terminal assembly 15 including the terminal fitting 16 upwardly in the fuse tube housing 11. This is accompanied by movement of the rod-like conductor or terminal 18 and the remaining portion of the strain element assembly 22. The arc incident to this operation is drawn in the auxiliary bore 23 and in the main bore 19 and is there extinguished.

It is desirable to provide some external indication that the fuse 10 either is in the intact unblown condition or that it has blown. This is particularly true where a number of these fuses are located adjacent each other within a protective enclosure provided with inspection windows but only one of them has blown. Since the fuse tube housing 11 is of opaque reinforced insulating material, it is not possible to determine by inspection the condition of the fuse 10. It is for this purpose that an indicator, shown generally at 35, is provided.

In order to provide an external indication that the fuse 10 has blown without requiring any mechanical connection between the internal mechanism of the fuse 10 and the indicating means, the terminal fitting 16 is provided wiht an annular groove 27 for receiving an annular permanent magnet 28 which also is shown in FIGS. 8 and 9. The annular permanent magnet 28 is surrounded by a lip 29 of the terminal fitting 16 and it is deformed at 30, FIG. 6, to hold the permanent magnet 28 in position. The rod-like conductor or terminal 18 extends axially through the permanent magnet 28 so that the latter is positioned concentrically around the path of current flow through the rod-like conductor or terminal 18. The upper and lower faces 31 and 32 of the annular permanent magnet 28 are magnetized to opposite polarities. For example, the upper face 31 over its entire surface is uniformly magnetized with a north polarity while the lower face 32 is uniformly magnetized with a south polarity. Thus the magnetic field from the upper and lower faces 31 and 32 of the annular permanent magnet 28 is the same for any circumferential position exterior to it. This is important since the actual annular position of the terminal fitting 16 and thereby of the annular permanent magnet 28 ordinarily is not readily determinable nor is it important from an operating standpoint insofar as the fuse 10 is concerned. Another reason for employing the opposite polarities for the upper and lower faces 31 and 32 of the annular permanent magnet 28 is to render negligible the effect of the magnetic field that is generated by high short-circuit current flow through the rod-like conductor or terminal 18. When it is recalled that this current flow may be of the order of several thousands of amperes, the demagnetizing effect that might be exerted thereby on a permanent magnet might be such as to effectively demagnetize it. By employing the configuration and arrangement described for the annular permanent magnet 28, the demagnetizing effect due to the magnetic field generated by current flow through the rod-like conductor or terminal 18 is negligible.

Advantage is taken of the changed position of the annular permanent magnet 28 from that shown in FIG. 1, where the fuse 10 is unblown, to that shown in FIG. 3, where the fuse 10 is blown, to provide magnetic indicating means externally of the fuse tube housing 11. This means includes an indicator assembly shown generally at 35.

FIG. 7 shows more clearly the details of construction of the indicator assembly 35. It includes a non-magnetic insulating indicator housing 36 that may be formed of suitable plastic material. The indicator housing 36 includes a bottom 37 and an outstanding annular flange 38 integral therewith. A cover disc 39 of suitable plastic material is fitted into the flange 38 and completes the housing 36. The cover disc 39 is held in place on the flange 38 by a bolt 40 which extends through the bottom 37. A sleeve nut 41 is threaded on the outer end of the bolt 40. A readily deformable gasket 42 is interposed between the underside of the head of the sleeve nut 41 and the adjacent outer surface of the cover disc 39. The purpose of this construction is to provide for absorbing, in part, the shock incident to the blowing of the fuse 10, if of vented construction as shown in FIG. 1, so that the shock is not transmitted in full to the indicating mechanism in the indicator housing 36. When the fuse 10 is provided with a muffler or condenser 10', FIG. 3, the shock is relatively slight and presents no problem.

The indicator mechanism within the housing 36 includes a pivot 43 that is threaded into the bottom 37 and rotatably supports one end of an insulating shaft 44 that is formed of suitable plastic material. The other end of the insulating shaft 44 is rotatably supported by a pivot 45 that extends through the cover disc 39. Adjacent a flange 46 that forms an integral part of the shaft 44 is an annular permanent magnet 47 which, as indicated in FIGS. 2 and 4, is magnetized with opposite polarities along a diameter. Adjacent to the annular permanent magnet 47 and movable therewith is an indicator disc 48 that may be formed of light weight material such as aluminum or of plastic material. It carries an indicator strip 49 which may carry the notation "Blown" that is hidden from view, as shown in FIG. 2, as long as the fuse 10 is unblown. After the fuse 10 has blown, the indicator strip 49 moves to the alternate position shown in FIG. 4. A clamp washer 50 serves to hold the indicator disc 48 against the annular permanent magnet 47 and to clamp the assembly securely for rotation with the insulating shaft 44 as a unit. The indicator strip 49 may be of sufficient weight to bias the indiactor disc 48 and parts rotatable therewith to the position shown in FIG. 2. Alternatively, a spring can be employed to provide this biasing action instead of relying solely on the biasing action of gravity through the provision of the indicator strip 49. The movement of the indicator disc 47 and part rotatable therewith is limited by the bolt 40 which projects through an arcuate slot 53 in the indicator disc 48. In the unblown position of the indicator disc 48, FIG. 2, one end of the arcuate slot 53 is adjacent the bolt 40. In the blown position, as shown in FIG. 4, the other end of the arcuate slot 53 is adjacent the bolt 40. A window 54 is provided in the cover disc 39 through which the indicator strip 49 carrying the notation "Blown" can be viewed when the fuse 10 has blown. The part of the indicator disc 48 that is visible through the window 54 when the fuse 10 is unblown may have conspicuous marking, such as a color or indicia to shown this condition.

It will be apparent that the only change required in the construction of the conventional fuse 10 is to provide a spring assembly including the terminal fitting 16 with the annular groove 27 for receiving the annular permanent magnet 28 and holding it in position. Existing fuse units can be converted to indicating units by replacement of the spring assembly with a terminal fitting 16 carrying the permanent magnet 28. The indicator assembly 35 is constructed as a separate and distinct unit and is arranged for separate application to the fuse tube housing 11. For this purpose an adhesive 55, FIG. 6, is employed between foot portions 56 formed integrally with the non-magnetic indicator housing 36. Additional adhesive 57 is employed between a spacer 58 and the fuse tube housing 11. The spacer 58 extends upwardly from and is formed integrally with the non-magnetic indicator housing 36. It is employed for properly spacing the indicator assembly 36 so that it is positioned as shown in FIG. 7 with respect to the location of the annular permanent magnet 28 in the blown fuse position. The length of the spacer 58 is such that, when it engages a shoulder 59 on the upper fuse tube terminal 12, the indicator assembly 35 is properly located.

In the event that the expected magnetic field generated by current flow through the rod-like conductor or terminal 18 is such as to exert a demagnetizing action on the annular permanent magnet 47, provision can be made by avoiding such demagnetization by employing a U-shaped magnetic shield 61, FIG. 6, in overlying relation to the permanent magnet 47 and on the side thereof away from the rod-like conductor or terminal 18. In this position the magnetic shield 61 with the inwardly directed end portions 62 serves as an effective magnetic shunt around the annular permanent magnet 47 and thereby reduces to a corresponding extent the demagnetizing action of the magnetic field generated by current flow through the rod-like conductor or terminal 18. The magnet 28, whose flux is at right angles to the flux generated by a current flow in rod-like conductor 18, is not prevented from reacting with the flux from magnet 47 within the U-shaped shield 61.

When the fuse 10 is in the unblown condition, it appears as shown in FIGS. 1 and 2. Here the movable terminal assembly 15 is in its lowermost position and remote from the indicator assembly 35. The indicator disc 48 occupies such a position that the indicator strip carrying the notation "Blown" is hidden from view. The north pole of the annular permanent magnet 47 is positioned above the axis of rotation of the indicator disc 48 while the south pole is positioned below this axis.

In operation, on blowing of the fusible element 21 and subsequently of the strain element assembly 22, the movable terminal assembly 15 is released for movement upwardly under the influence of the coil tension spring 24. The arc is drawn and extinguished in the main bore 19 and in the auxiliary bore 23 as the case may be. The spring 27 moves the terminal assembly 15 upwardly to the position shown in FIG. 3. The shock incident to the blowing of a vented fuse 10 at full interrupting rating and applied to the fuse tube housing 11 is absorbed to a limited extent by the readily deformable gasket or elastic washer 42 and thus is not transmitted with full force to the cover disc 39 and thereby to the insulating shaft 44 and parts mounted thereon. The beveled ends of the pivots 43 and 45 may deflect the cover disc 39 outwardly while the washer 42 is compressed. As pointed out, when the muffler or condenser 10' is used, the shock incident to blowing of the fuse 10 is slight.

In the alternate position of the movable terminal assembly shown in FIG. 3 the reaction between the north and south poles of the annular permanent magnet 28 mounted in the terminal fitting 16 with the north and south poles of the annular permanent magnet 47 which is rotatably mounted in the non-magnetic indicator housing 36 is such that the annular permanent magnet 47 together with the indicator disc 48 is rotated against the biasing force acting to hold them in the position shown in FIG. 2 to rotate to the position shown in FIG. 4 where the notation "Blown" appears uppermost and can be noted through the window 54. The rotary movement of the indicator disc 48 is limited in the blown position by the bolt 40. As long as the annular permanent magnet 28 on the terminal fitting 16 remains in the position shown in FIG. 3, the indicator disc 48 remains in the position shown in FIG. 4. When the fuse 10 is restored to operative condition, the annular permanent magnet 28 carried by the terminal fitting 16 is returned to the unblown condition shown in FIG. 1. Then the indicator disc 48 and parts rotatable therewith rotate to the unblown condition shown in FIG. 2 under the biasing action of the indicator strip 49 or a spring, if a spring is employed.

What is claimed as new is:

1. In a circuit interrupter for controlling current flow in an electric circuit, in combination a non-magnetic housing,
   a conductor through which said current flows normally occupying one position in said housing when said circuit interrupter is closed and means for moving said conductor to an alternate position when said circuit interrupter is opened,
   an annular permanent magnet surrounding said conductor, secured to and movable therewith and having its opposite faces magnetized to opposite polarities whereby current flow through said conductor has negligible effect on the magnetic field of said permanent magnet, and
   an indicator permanent magnet, means movably mounting said second permanent magnet exteriorly of said housing effectively out of the magnetic field of said annular permanent magnet in said one position and within said magnetic field of said first permanent magnet in said alternate position whereby said indicator permanent magnet is shifted from one position corresponding to said one position of said conductor to an alternate position corresponding to said alternate position of said conductor.

2. The circuit interrupter according to claim 1 wherein said indicator permanent magnet is mounted for rotation in a non-magnetic indicator housing about an axis perpendicular to the path along which said annular permanent magnet is movable, and
   indicator means is carired by and is movable with said indicator permanent magnet.

3. The circuit interrupter according to claim 1 wherein magnetic shield means overlies said indicator permanent magnet on the side away from said conductor whereby the demagnetizing effect on said indicator permanent magnet generated by current flow in said conductor is minimized.

4. The circuit interrupter according to claim 2 wherein said non-magnetic indicator housing and parts assembled therewith are mountable as a separate and distinct unit on said non-magnetic housing of said circuit interrupter.

5. The circuit interrupter according to claim 4 wherein said non-magnetic indicator housing includes a spacing member for locating it on said non-magnetic housing of said circuit interrupter at a position where said indicator permanent magnet is in operative juxtaposition to said annular permanent magnet when the latter occupies said alternate position.

6. In a fuse for protecting an electric circuit against flow of excessive current, the combination with
   an insulating fuse tube, having a fusible means mounted therein, and
   a terminal assembly normally occupying one position longitudinally in said fuse tube when said fuse means is unblown and longitudinally movable along a path to an alternate position when said fuse is blown, of indicating means including:
      a first permanent magnet mounted on said terminal assembly and movable therewith from said one position to said alternate position, and
      a second permanent magnet, means movably mounting said second permanent magnet exteriorly of said housing out of the field of said first permanent magnet in said one position and in said field in said alternate position whereby said second permanent magnet is shifted from one position corresponding to the unblown condition of said fuse to an alternate position corresponding to the blown condition of said fuse.

7. The invention, as set forth in claim 6, wherein the second permanent magnet is biased to its one position and is held in its alternate position by the first permanent magnet in the alternate position thereof.

8. The invention, as set forth in claim 6, wherein the second permanent magnet is mounted to rotate about an axis in a plane at right angles to the path along which the first permanent magnet moves.

9. The invention, as set forth in claim 6, wherein the terminal assembly includes a rod-like conductor through which the current flows and which moves along said path endwise to the alternate position, and the first permanent magnet is annular in configuration, is mounted coaxially about and at right angles to the axis of said rod-like conductor, and its opposite faces are magnetized to opposite polarities, whereby the magnetic field of said first permanent magnet reacts in its alternate position with the magnetic field of the second permanent magnet with the same force independently of the angular position of said first permanent magnet with respect to said second permanent magnet.

10. The invention, as set forth in claim 9, wherein the second permanent magnet is annular in configuration, is magnetized along a diameter, and is mounted for rotation in a non-magnetic indicator housing about an axis perpendicular to the rod-like conductor, indicator means is carried by and is movable with said second permanent magnet, and said second permanent magnet and said indicator means are biased to the one position thereof and the first permanent magnet in its alternate position overcomes the bias acting on said second permanent magnet and said indicator means and moves the same from non-indicating to indicating position.

11. The invention, as set forth in claim 10, wherein stop means carried by the non-magnetic indicator housing limits rotation of the second permanent magnet means and the indicator means in their non-indicating and indicating positions.

12. The invention, as set forth in claim 10, wherein the fuse tube has terminals at its ends and the terminal assembly and first permanent magnet movable therewith occupy a predetermined position with respect to one of said fuse tube terminals after the fuse is blown, the non-magnetic indicator housing and parts assembled therewith are mounted as a separate and distinct unit on said fuse tube, and a spacing member extends from said non-magnetic indicator housing for locating the same with respect to said one fuse tube terminal at a position where the second permanent magnet is in operative juxtaposition to said first permanent magnet when the latter occupies its blown fuse position.

References Cited by the Examiner
UNITED STATES PATENTS

| | | | |
|---|---|---|---|
| 1,450,670 | 4/1923 | LaMar | 200—121 |
| 1,942,052 | 1/1934 | Foust et al. | 324—103 |
| 2,869,475 | 1/1959 | Bobo | 200—83 |
| 3,167,694 | 1/1965 | Bekedam | 317—201 |

BERNARD A. GILHEANY, *Primary Examiner.*

H. B. GILSON, *Examiner.*